Patented Nov. 24, 1925.                                                              1,563,188

UNITED STATES PATENT OFFICE.

WILLIAM G. HARVEY, OF NIAGARA FALLS, NEW YORK, ASSIGNOR TO AMERICAN MAGNESIUM CORPORATION, OF NIAGARA FALLS, NEW YORK, A CORPORATION OF NEW YORK.

TREATING MOLTEN METALS WITH CALCIUM-COPPER ALLOYS.

No Drawing.          Application filed September 10, 1921. Serial No. 499,784.

*To all whom it may concern:*

Be it known that WILLIAM G. HARVEY, citizen of the United States, residing at Niagara Falls, in the county of Niagara and State of New York, has invented certain new and useful Improvements in Treating Molten Metals with Calcium-Copper Alloys, of which the following is a specification.

My invention relates to the treatment of molten metals and alloys and particularly to the refining and alloying of the same.

One of the objects of the invention is the provision of a copper calcium alloy which may be added to molten alloys, where it is either desirable or not objectionable to add a small quantity of copper or calcium in addition to refining the same.

The alloys with which this alloy is especially adapted for use are the aluminum bronzes.

The specific gravity of metallic calcium is 1.54, while most of the alloys to which it will be added are much heavier. If calcium was to be added to such alloys in an unalloyed condition considerable difficulty would be experienced in forcing it beneath the surface of the molten alloys. Furthermore, metallic calcium as commercially available varies greatly in purity and oxidizes rapidly in air, so that its use in this form is attended by much difficulty.

Calcium is also a very vigorous deoxidizing agent and when it is added to molten metal in an undiluted form, the reaction which takes place may be so violent as to project the molten metal out of the holding receptacle.

Metallic calcium has a melting point of about 805 degrees C., whereas the calcium copper alloy which I use has a melting point much below this. This is a very definite aid when deoxidizing a pot of metal, for when this alloy is used, on account of its much lower melting point, it very quickly melts and is rapidly and thoroughly disseminated throughout the metal.

Calcium copper in the form of an alloy containing from approximately 40-60% of calcium imparts to the treated metal all the desirable features of metallic calcium with the added advantage that it is easy to apply. It is important in all deoxidizing work to add the proper quantities of the deoxidizing agent as overdosing often produces injurious qualities. When deoxidizing by means of the copper calcium alloy herein specified the amount of calcium to be added can be more closely regulated.

The proportions of metals found most desirable for this use are 50% calcium and 50% copper, although the percentages may vary in each case from 40-60. An alloy of these proportions is very brittle, which allows it to be easily broken into a convenient size and into an exact weight when being added to a pot of metal. The specific gravity of the 50—50 alloy is 2.8 and it has a melting point of 630 degrees C.

Ordinary aluminum bronze containing ten per cent aluminum, which is one of the alloys particularly intended to be treated with the copper calcium alloy, has a specific gravity of 7.3 and a melting point of about 1020-1030 degrees C. The addition of a 50—50 copper calcium alloy to this metal has the advantage of a much lower melting point than the aluminum bronze and also of a sufficiently higher specific gravity than calcium so that such alloy is more readily incorporated into the metal to be deoxidized.

In carrying out the process, I utilize a carbon lined furnace, in which the bottom of the furnace is the negative pole. Anode bus bars are suspended over the furnace and from them, depend into the furnace, a suitable number of carbon electrodes.

In starting a furnace, a suitable quantity of preferably flat pieces of solid copper is placed upon the carbon bottom. Any scrap copper calcium alloy from previous runs may be put in at this time, as an aid to the starting of the furnace, by more quickly lowering the melting point of the cathode. Using electric current, preferably alternating, arcs are struck upon these copper pieces, a favorable voltage for this operation being in the neighborhood of 55. Dried calcium chloride, from which the water of crystallization has been removed by previous fusion, is fed into the furnace around these arcs, and a molten bath very quickly results. The current is then carried through this molten bath and the arcs disappear. This operation of melting is continued until a suitable depth of bath is attained. If alternating current has been used in the preliminary stage, direct current is then substituted. Electrolysis starts at once as is made evident by a very vigorous boiling action around the anodes which is caused by chlorine gas, which is the product at the anode. Metallic calcium deposits on the solid pieces of copper, which act as a cathode. A considerable quantity of calcium is taken up and alloys with the copper before the melting point of the alloy is reached. As the copper continues to absorb calcium, the melting point of the alloy is gradually reduced and eventually the cathode becomes molten. Suitable quatities of dried calcium chloride are added at intervals as the level of the electrolyte lowers.

Metallic copper is added at intervals and with the purpose of keeping the calcium content in the molten cathode, during most of the period of production, at from 20–30% or an average of approximately 25%. After the last addition of copper has been made, the furnace is then run for a period of time, until the alloy has a specific gravity of about 2.8 which corresponds to about 50% of calcium. The furnace is then tapped. The best operating temperature for carrying out the process is approximately from 775–825 degrees C. The particular advantages derived from such proportions in the use of this alloy for the particular purposes herein specified give to an alloy of substantially these proportions a decided technical advantage.

From the above description, it will be apparent that I have produced an alloy which accomplishes the purposes for which intended and while I have set forth specific proportions and uses for the same, it will be understood that I reserve the right to all changes properly falling within the spirit and scope of the appended claims.

I claim:

1. The method of deoxidizing aluminum bronze comprising adding to the molten metal an alloy of calcium and copper in such proportions that the alloy is brittle and which has a melting point substantially less than that of the treated metal.

2. The method of alloying copper with an aluminum containing metal and simultaneously deoxidizing the said metal, comprising treating the said metal with an alloy of calcium and copper in such proportions that the alloy is brittle and has a melting point less than that of the treated metal.

3. The method of deoxidizing aluminum bronze comprising adding to the molten metal an alloy of calcium and copper containing from 40–60% calcium.

4. The method of deoxidizing aluminum bronze comprising treating the molten metal with an alloy containing approximately 50% of calcium and 50% of copper.

In testimony whereof I affix my signature.

WILLIAM G. HARVEY.